US010919800B2

(12) United States Patent
Hurst et al.

(10) Patent No.: US 10,919,800 B2
(45) Date of Patent: Feb. 16, 2021

(54) PLANARISATION OF A COATING

(71) Applicant: PILKINGTON GROUP LIMITED, Lathom (GB)

(72) Inventors: Simon James Hurst, Runcorn (GB); Karikath Sukumar Varma, Southport (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 15/318,402

(22) PCT Filed: Jun. 30, 2015

(86) PCT No.: PCT/GB2015/051919
§ 371 (c)(1),
(2) Date: Dec. 13, 2016

(87) PCT Pub. No.: WO2016/001661
PCT Pub. Date: Jan. 7, 2016

(65) Prior Publication Data
US 2017/0121219 A1 May 4, 2017

(30) Foreign Application Priority Data

Jul. 2, 2014 (GB) .................................. 1411822.8

(51) Int. Cl.
*C03C 17/34* (2006.01)
*C03C 17/36* (2006.01)

(52) U.S. Cl.
CPC .......... *C03C 17/3417* (2013.01); *C03C 17/34* (2013.01); *C03C 17/3618* (2013.01);
(Continued)

(58) Field of Classification Search
CPC ...... C03C 17/3607; C03C 17/38; C03C 17/30
See application file for complete search history.

(56) References Cited

U.S. PATENT DOCUMENTS 5,747,623 A * 5/1998 Matsuo ................. C03C 17/007
525/474
5,922,411 A 7/1999 Shimizu et al.
(Continued)

FOREIGN PATENT DOCUMENTS

EP 0781815 A1 7/1997
JP H4-269714 A 9/1992
(Continued)

OTHER PUBLICATIONS

Wikipedia entry for Polysilazane, no date.*
(Continued)

*Primary Examiner* — Alex A Rolland
(74) *Attorney, Agent, or Firm* — Marshall & Melhorn, LLC

(57) ABSTRACT

Methods are disclosed for planarisation of a coated glass substrate by deposition of a silazane based layer thereon. Coated substrates according to the invention exhibit improved properties in terms of reduced roughness, lower haze and higher visible light transmission and the coated surface may be exposed to the external environment, for example as surface 1 or surface 4 of a double glazing unit. The resulting smooth surface is less susceptible to marking and scratch damage, and offers enhanced surface energy (improved hydrophobicity).

18 Claims, 2 Drawing Sheets

(52) U.S. Cl.
CPC ...... *C03C 17/3644* (2013.01); *C03C 2217/76* (2013.01); *C03C 2217/77* (2013.01); *C03C 2217/94* (2013.01); *C03C 2218/116* (2013.01); *C03C 2218/32* (2013.01)

(56) References Cited

U.S. PATENT DOCUMENTS

| | | | |
|---|---|---|---|
| 6,083,860 | A | 7/2000 | Matsuo et al. |
| 6,436,541 | B1* | 8/2002 | Sopko ............... G02B 1/116 428/432 |
| 8,277,929 | B2 | 10/2012 | Yasuzawa et al. |
| 10,150,697 | B2 | 12/2018 | McSporran et al. |
| 2002/0136905 | A1* | 9/2002 | Medwick ............... C03C 17/36 428/432 |
| 2004/0028828 | A1* | 2/2004 | Aoki ............... C09D 183/16 427/387 |
| 2018/0138611 | A1 | 5/2018 | Pinol Pedret et al. |

FOREIGN PATENT DOCUMENTS

| | | |
|---|---|---|
| JP | H05105486 A | 4/1993 |
| JP | H05119307 A | 5/1993 |
| JP | H08165146 A | 6/1996 |
| JP | H10120446 A | 5/1998 |
| JP | 2000190416 A | 7/2000 |
| JP | 2003149580 A | 5/2003 |
| JP | 2003-308741 A | 10/2003 |
| JP | 2005029401 A | 2/2005 |
| JP | 2013-22799 A | 2/2013 |
| KR | 20090019226 A | 2/2009 |
| WO | 2008047886 A1 | 4/2008 |

OTHER PUBLICATIONS

European Patent Office; The International Search Report with Written Opinion; issued in PCT/GB2015/051919; dated Dec. 17, 2015; 15 pages; The European Patent Office, Rijswijk, Netherlands.

M. Komatsu et al; Liquid crystal display device with uniformity of colour and image—has silica based coating formed of soln. contg. poly; silazane(s) on transparent electrode of LCD cell; XP002744366; May 18, 1993; vol. 1993, Nr: 24; WPI/Thomson Scientific, London, GB.

T. Sekiguchi; Reflective mirror for liquid crystal projector, is made of silicon dioxide, and has press surface having micro roughness, changed into smooth mirror surface by converting olysilazane coated on press surface, to silicon dioxide; XP002744367; Feb. 3, 2005; WPI/Thomson Scientific, London, GB.

K. Nishimura; Polygon mirror as optical deflector in laser beam printer, is formed by applying liquid comound containing precursor for forming silica layer, on reflecting surface and converting to silicon dioxide; XP002744368; May 21, 2003; WPI/Thomson Scientific, London, GB.

A. Kitamura et al; Hydrophilic composite for opaque shutters including layer containing perhydropolysilazane and hyrophilic film formed on base; XP002744369; Jul. 11, 2000; WPI/Thomson Scientific, London, GB.

Y. Hagiwara et al; Container for storage of silica group coating liquid used in electronic components manufacture e.g. LCD, semiconductor devices—has internal circumference processed with heat acidic gas; XP002744370; May 12, 1998; WPI/Thomson Scientific, London, GB.

M. Komatsu et al; Mfr. of smooth glass substrate for use in LCD—comprises coating glass substrate coated with soln. contg. specified poly: silazane cpd(s); XP002744371; Apr. 27, 1993; WPI/Thomson Scientific, London, GB.

S.H. Chang et al; Method for forming glass film for surface protection, involves coating polysilazane on surface of substrate, and curing by plasma process under atmospheric pressure; XP002744372; Feb. 25, 2009; WPI/Thomson Scientific, London, GB.

M. Hirugawa et al; UV- and IR absorbing glass for windows or display devices—comprises transparent glass substrate, UV and IR absorbing thin films and protective top coating; XP002744373; Jun. 25, 1996; vol. 1996, Nr: 35; WPI/Thomson Scientific, London, GB.

* cited by examiner

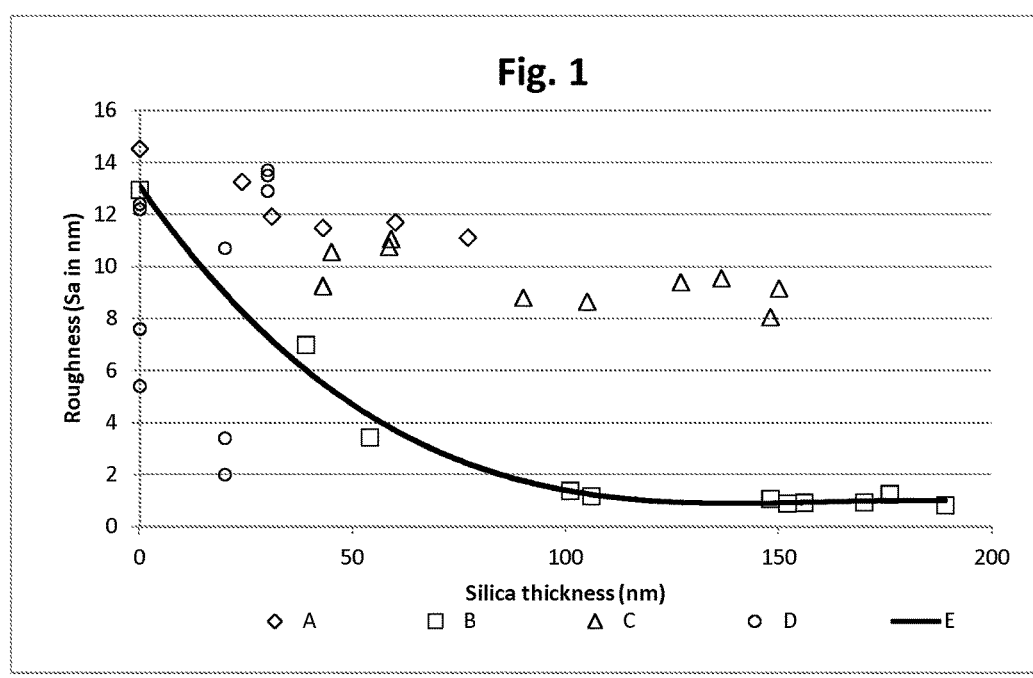
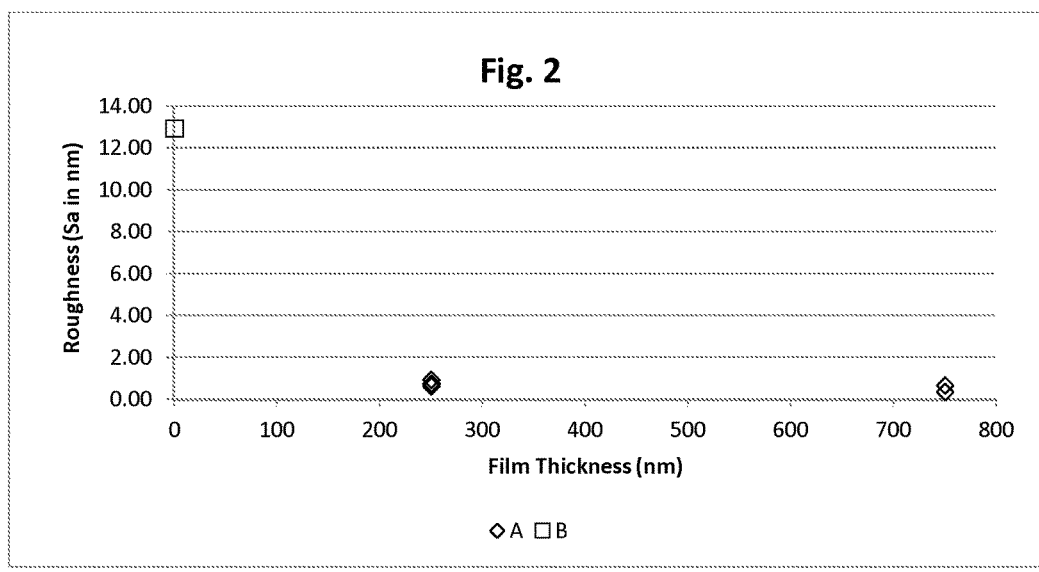

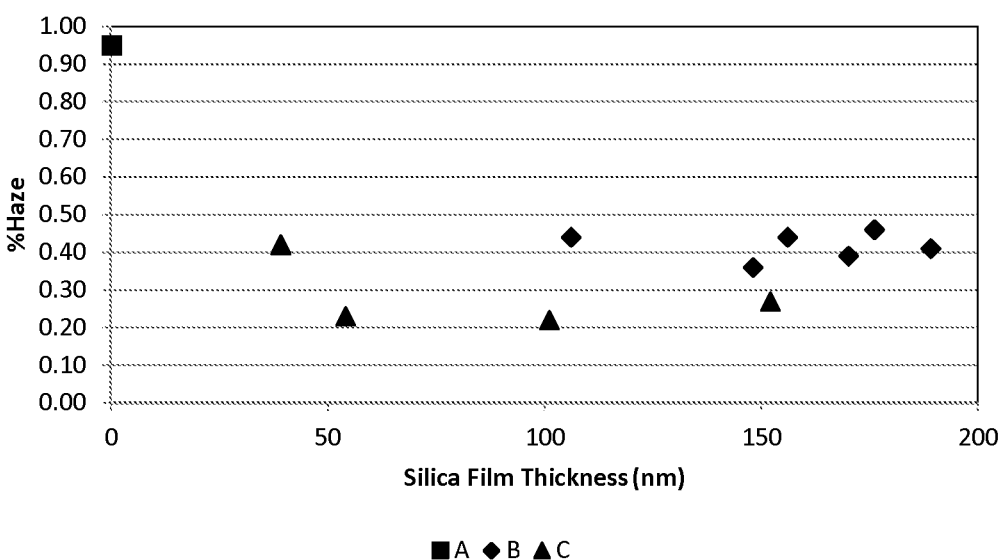

PLANARISATION OF A COATING

BACKGROUND OF THE INVENTION

This invention relates to a method of planarising a surface of a coating on a glass pane, the product obtained by such a method and the use of silazanes to planarise a surface of a coating on a glass pane.

In the context of the present invention the term "planarise" means "smoothen or flatten".

Attempts have previously been made to planarise rough coatings on glass, for example by overcoating with silica and/or by polishing. Although overcoating with silica provides a degree of planarisation, it would be beneficial to provide an even smoother surface. Polishing affords a more planar surface but is time consuming.

EP 0781815 A1 discloses a composition including a silazane-based polymer for forming a ceramic material useful for smoothly forming a ceramic film at a low temperature on surfaces of solid products.

SUMMARY OF THE INVENTION

It would be desirable to provide an enhanced approach to planarise the surface of a coated glass pane.

According to a first aspect of the present invention there is provided a method of planarising a surface of a coating on a glass pane comprising:

providing a glass pane that is directly or indirectly coated on a major surface thereof with an underlayer, and depositing at least one layer based on one or more silazane on said underlayer.

The inventors have surprisingly found that by depositing at least one layer based on a silazane on an underlayer coating a glass pane, the surface of said underlayer is planarised to a high degree. The resultant coated pane exhibited reduced roughness, lower haze and higher visible light transmission. The planarisation of rough underlayers enables the use of a coating on surface 1 or surface 4 of a double glazing unit (or indeed on the exposed surface of any glass sheet). The resulting smooth surface is less prone to marking and scratch damage, and offers enhanced surface energy (improved hydrophobicity). As is conventional in the art, the surface of a double glazing unit configured to face the external environment of a structure in which the double glazing unit is installed is referred to as surface 1. The surface opposite surface 1 is referred to as surface 2. The surface of the double glazing unit facing the interior of the structure in which the double glazing unit is installed is referred to as surface 4. The surface opposite surface 4 is surface 3.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

In the context of the present invention, where a layer is said to be "based on" a particular material or materials, this means that the layer predominantly consists of the corresponding said material or materials, which means typically that it comprises at least about 50 at. % of said material or materials.

Said silazane may be one or more of tetramethyldisilazane, hexamethyldisilazane, hexamethylcyclotrisilazane, diethyltetramethyldisilazane, trimethyltrivinylcyclotrisilazane, tetramethyldiphenyldisilazane, and/or dimethyltetraphenyldisilazane. Preferably said silazane is a polysilazane and/or an oligomeric silazane. Said polysilazane may be perhydropolysilazane and/or an organopolysilazane such as a polymethylsilazane and/or a polydimethylsilazane. Polysilazanes are polymers in which silicon and nitrogen atoms alternate to form a backbone. Within the backbone each silicon atom is bound to two separate nitrogen atoms and each nitrogen atom to two silicon atoms, therefore both chains and rings of the formula $[R1R2Si-NR3]_n$ can occur. R1-R3 can be hydrogen atoms or organic substituents. If all R substituents are H atoms, the polymer is designated as perhydropolysilazane (also known as polyperhydridosilazane or inorganic polysilazane, $[H_2Si-NH]_n$). If hydrocarbon substituents are bound to the silicon atoms, the polymers are designated as organopolysilazanes. Molecularly, polysilazanes $[R1R2Si-NH]_n$ are isoelectronic with and close relatives to polysiloxanes $[R1R2Si-O]_n$ (silicones). Preferably said polysilazane is a perhydropolysilazane and/or a polydimethylsilazane. In some embodiments the polysilazane may be a poly-metallo-silazane and/or a silazane copolymer.

Preferably the polysilazane has a number average molecular weight of 200 to 500,000 g/mol, more preferably 1000 to 200,000 g/mol, even more preferably 2000 to 100,000 g/mol. The polysilazane may have a density of 0.5 to 1.5 g/cm$^3$, preferably of 0.7 to 1.3 g/cm$^3$, more preferably of 0.8 to 1.2 g/cm$^3$, even more preferably of 0.5 to 1.5 g/cm$^3$.

Preferably said at least one layer based on one or more silazane is deposited by spin coating, slot die coating, spraying such as flame spray coating, roller coating, dipping, and/or printing. Most preferably the layer based on a silazane is deposited by spraying. Preferably prior to deposition the silazane is solvated or suspended in a liquid. Preferably said liquid comprises one or more hydrocarbon solvent. Said hydrocarbon solvent may comprise aliphatic and/or aromatic moieties. Said hydrocarbon solvent may be halogenated. Said solvent may comprise one or more of dibutylether, xylene, toluene, benzene, chloroform, and dichloromethane.

Preferably said at least one layer based on one or more silazane has a thickness of at least 10 nm, more preferably at least 50 nm, even more preferably at least 80 nm, most preferably at least 100 nm; but preferably at most 800 nm, more preferably at most 400 nm, even more preferably at most 200 nm, most preferably at most 150 nm. Thinner layers are advantageous for cost reasons. Preferably the thickness is a quarter wavelength for improved anti-reflection and light transmission.

The method may further comprise partially or completely converting the at least one layer based on one or more silazane to at least one layer based on silica and/or an organo silica. Said silica and/or organo silica may be polymeric. Said organo silica may have the formula $\{-SiO(R_1)-O-\}_n$ where $R_1$ comprises an alkyl and/or phenyl moiety. Alternatively, said organo silica may have the formula $\{-Si(R_1)(R_2)-O-\}_n$ where each of $R_1$ or $R_2$ comprise alkyl and/or phenyl moieties. Said alkyl and/or phenyl moieties may comprise from one to ten carbon atoms, preferably from one to five carbon atoms. Said alkyl moieties may comprise methyl, ethyl, propyl, butyl, pentyl and/or hexyl groups, and/or polymerisable groups such as alkenes (e.g. vinyl groups), and/or carbonyl groups. Preferably said organo silica may have the formula $\{-Si(CH_3)_2-O-\}_n$.

Said conversion may comprise treating the pane with heat, UV radiation and/or IR radiation after depositing the layer based on one or more silazane.

Said heat treatment may comprise heating the pane at at least 100° C., preferably at least 200° C., even more preferably at least 300° C., even more preferably at least 350° C., most preferably at least 450° C., but preferably at most 1000° C., more preferably at most 800° C., even more preferably at most 700° C., even more preferably at most 600° C., most preferably at most 550° C. These preferred temperatures help ensure that the at least one layer based on one or more silazane, which may have been deposited as a liquid, is cured to form a well adhered solid coating. Temperatures of at least 300° C. help ensure complete transformation of the silazane to silica and/or an organo silica.

Preferably said heat treatment comprises heating the pane at said temperature for at least 30 min, more preferably at least 45 min, even more preferably at least 1 hr, most preferably at least 90 min, but preferably at most 5 hr, more preferably at most 4 hr, even more preferably at most 3 hr. Such time periods help ensure complete transformation to silica and/or an organo silica.

Preferably said heat treatment further comprises heating the pane to said temperature over a period of at least 20 min, more preferably at least 40 min, even more preferably at least 50 min, most preferably at least 1 hr. Heating the pane gradually to the desired temperature over such preferred minimum time periods helps avoid rapid solvent loss and the formation of defects.

Said UV and/or IR radiation treatment may comprise exposing the layer based on one or more silazane to UV and/or IR radiation. Said UV and/or IR treatment may comprise exposing said layer to UV and/or IR radiation for at least 3 min, more preferably at least 5 min, even more preferably at least 7 min, most preferably at least 9 min, but preferably at most 1 hr, more preferably at most 30 min, even more preferably at most 20 min, most preferably at most 15 min. Such time periods help ensure complete transformation to silica and/or an organo silica. The UV radiation may be UVA, UVB and/or UVC radiation. Preferably the UV radiation is UVC radiation.

Preferably said at least one layer based on silica and/or an organo silica has a thickness of at least 10 nm, more preferably at least 50 nm, even more preferably at least 80 nm, even more preferably at least 90 nm, most preferably at least 100 nm; but preferably at most 800 nm, more preferably at most 400 nm, even more preferably at most 200 nm, most preferably at most 150 nm.

A surface of the at least one layer based on silica and/or an organo silica may have an arithmetical mean height of the surface value, Sa, of at least 0.3 nm, but preferably at most 3 nm, more preferably at most 2 nm, even more preferably less than 2 nm, even more preferably at most 1.9 nm, even more preferably at most 1.5 nm, even more preferably at most 1 nm, most preferably at most 0.85 nm. Sa gives an indication of the roughness of a surface.

Preferably, after depositing the layer based on one or more silazane, and/or after partially or completely converting the layer based on one or more silazane to at least one layer based on silica and/or an organo silica, said pane exhibits a haze of at least 0.2%, but preferably at most 1.0%, more preferably at most 0.8%, even more preferably at most 0.6%, most preferably at most 0.45%. The haze values are to be measured in accordance with the ASTM D 1003-61 standard. The lower haze exhibited by panes processed in accordance with the present invention is advantageous because it represents fewer visible defects, which are of course undesirable to consumers.

The underlayer preferably comprises at least one layer based on a transparent conductive coating (TCC). Preferably the TCC is a transparent conductive oxide (TCO). Preferably the TCO is one or more of fluorine doped tin oxide ($SnO_2$:F), zinc oxide doped with aluminium, gallium or boron (ZnO:Al, ZnO:Ga, ZnO:B), indium oxide doped with tin (ITO), cadmium stannate, ITO:ZnO, ITO:Ti, $In_2O_3$, $In_2O_3$—ZnO (IZO), $In_2O_3$:Ti, $In_2O_3$:Mo, $In_2O_3$:Ga, $In_2O_3$:W, $In_2O_3$:Zr, $In_2O_3$:Nb, $In_{2-2x}M_xSn_xO_3$ with M being Zn or Cu, ZnO:F, $Zn_{0.9}Mg_{0.1}O$:Ga, (Zn,Mg)O:P, ITO:Fe, $SnO_2$:Co, $In_2O_3$:Ni, $In_2O_3$:(Sn,Ni), ZnO:Mn, and/or ZnO:Co.

Preferably each layer of the at least one layer based on a TCC has a thickness of at least 20 nm, more preferably at least 100 nm, even more preferably at least 200 nm, even more preferably at least 250 nm, most preferably at least 300 nm; but preferably at most 600 nm, more preferably at most 450 nm, even more preferably at most 370 nm, most preferably at most 350 nm. These thicknesses are preferred in order to strike a balance between the properties of 1) conductivity 2) absorption (the thicker the layer the more absorption and the lower the transmission) and 3) colour suppression (certain thicknesses are better for obtaining a neutral colour).

Preferably the underlayer further comprises at least one further layer, wherein said at least one further layer is based on an oxide of a metal or of a metalloid, such as $SiO_2$, $SnO_2$, $TiO_2$, silicon oxynitride and/or aluminium oxide. One layer of said at least one layer based on an oxide of a metal or of a metalloid is preferably located in direct contact with said major surface of said glass pane. Additionally, or alternatively, one layer of said at least one layer based on an oxide of a metal or of a metalloid is preferably located in direct contact with the layer based on a TCC. Such a layer based on an oxide of a metal or of a metalloid may act as a blocking layer to prevent the diffusion of sodium ions to the surface, which can be a source of corrosion, or it may act as a colour suppression layer to suppress iridescent reflection colours resulting from variations in thickness of the layers.

Preferably each layer of the at least one further layer based on an oxide of a metal or of a metalloid has a thickness of at least 5 nm, more preferably at least 10 nm, even more preferably at least 15 nm, most preferably at least 20 nm; but preferably at most 100 nm, more preferably at most 50 nm, even more preferably at most 40 nm, most preferably at most 30 nm.

In some embodiments the underlayer preferably comprises, in sequence from the glass substrate,
  at least one layer based on $SnO_2$,
  at least one layer based on $SiO_2$, and
  at least one layer based on $SnO_2$:F,
  wherein the at least one layer based on $SnO_2$ has a thickness of at least 15 nm, but at most 35 nm,
  wherein the at least one layer based on $SiO_2$ has a thickness of at least 15 nm, but at most 35 nm, and
  wherein the at least one layer based on $SnO_2$:F has a thickness of at least 300 nm, but at most 600 nm.

Preferably the at least one layer based on $SnO_2$ has a thickness of at least 20 nm, more preferably at least 23 nm, even more preferably at least 24 nm, but preferably at most 30 nm, more preferably at most 27 nm, even more preferably at most 26 nm.

Preferably the at least one layer based on SiO$_2$ has a thickness of at least 20 nm, more preferably at least 23 nm, even more preferably at least 24 nm, but preferably at most 30 nm, more preferably at most 27 nm, even more preferably at most 26 nm.

Preferably the at least one layer based on SnO$_2$:F has a thickness of at least 320 nm, more preferably at least 330 nm, even more preferably at least 335 nm, but preferably at most 400 nm, more preferably at most 360 nm, even more preferably at most 350 nm, even more preferably at most 345 nm.

In some embodiments the underlayer preferably comprises, in sequence from the glass pane:
a lower anti-reflection layer,
a silver-based functional layer; and
at least one further anti-reflection layer.

The lower and/or further anti-reflection layer may comprise at least one dielectric layer based on an (oxy)nitride of Si and/or an (oxy)nitride of Al and/or alloys thereof; and/or based on a metal oxide such as an oxide of one or more of Ti, Zr, Zn, Sn, In, and/or Nb, such as an oxide of Zn and Sn. Said dielectric layers may preferably have a thickness of at least 1 nm, more preferably at least 2 nm, even more preferably at least 5 nm, most preferably at least 10 nm; but preferably at most 70 nm, more preferably at most 50 nm, even more preferably at most 40 nm, most preferably at most 30 nm.

The at least one further anti-reflection layer preferably further comprises at least one barrier layer. Preferably said barrier layer is located in direct contact with the silver-based functional layer. Preferably said barrier layer is based on NiCr, Nb, Ti, Zr, Zn, Sn, In, and/or Cr and/or their oxides and/or nitrides. The at least one barrier layer may preferably have a total thickness of at least 0.5 nm, more preferably at least 1 nm, even more preferably at least 3 nm, most preferably at least 5 nm; but preferably at most 12 nm, more preferably at most 10 nm, even more preferably at most 8 nm, most preferably at most 7 nm. These preferred thicknesses enable further ease of deposition and improvement in optical characteristics such as haze whilst retaining mechanical durability.

In some embodiments the underlayer comprises more than one silver-based functional layer. For example, the underlayer may comprise two, three or more silver-based functional layers. When the underlayer comprises more than one silver-based functional layer, each silver-based functional layer may be spaced apart from an adjacent silver-based functional layer by a central anti-reflection layer.

In some embodiments the method may further comprise depositing at least one overlayer on the at least one layer based on a one or more silazane and/or based on silica and/or an organo silica. Said at least one overlayer may be based on one or more of the materials listed above for: the underlayer, the layer based on an oxide of a metal or of a metalloid, the lower anti-reflection layer, the silver-based functional layer, the further anti-reflection layer, and/or the layer based on one or more silazane and/or based on silica and/or an organo silica.

In some embodiments the method may further comprise depositing at least one opposing layer on an opposing major surface of the glass pane (i.e. not the major surface coated with the underlayer). Said at least one opposing layer may be based on one or more of the materials listed above for: the underlayer, the layer based on an oxide of a metal or of a metalloid, the lower anti-reflection layer, the silver-based functional layer, the further anti-reflection layer, and/or the layer based on one or more silazane and/or based on silica and/or an organo silica. Said at least one opposing layer may be deposited before or after said underlayer and/or said layer based on one or more silazane.

Preferably said at least one layer based on one or more silazane and/or based on silica and/or an organo silica is absent in one or more regions. Preferably the regions in which said at least one layer is absent are arranged in a repeating pattern. Preferably at least a portion of said regions form at least one sign. Preferably the transmitted and/or reflected light through said glass pane coated with at least said underlayer and at least one layer based on one or more silazane and/or based on silica and/or an organo silica is different from the transmitted and/or reflected light through said glass pane coated with at least said underlayer in a region where said at least one layer based on one or more silazane and/or based on silica and/or an organo silica is absent. Such arrangements provide an observer with a visibly perceptible distinction between the regions in which the at least one layer based on one or more silazane and/or based on silica and/or an organo silica is present and the regions in which said at least one layer is absent. This visible distinction may be apparent under normal light conditions such as daylight and/or artificial light sources. The distinction between said regions may have the appearance of a watermark effect which is both unobtrusive and readily apparent. The sign may comprise numbering or lettering, for instance to indicate a room number. Alternatively or additionally the sign may indicate that the pane, or a door in which the pane is incorporated, can be used as a fire escape/fire exit and/or a route for emergency services to access a building e.g. by incorporating a symbol that indicates a fire escape/exit such as the symbol of a running person or an exclamation mark, depicting an access point for emergency services, and/or incorporating words such as "fire escape", "fire exit" or "emergency access".

The absence of the at least one layer based on one or more silazane in one or more regions may be achieved by depositing said layer based on one or more silazane through a mask and/or by partially removing said layer based on one or more silazane after deposition. The partial removal of the layer based on one or more silazane may be conducted using chemical, laser and/or sandblasting means. The chemical means may comprise removal with a concentrated solution of hydrofluoric acid.

The glass pane may be a clear metal oxide-based glass pane. Preferably the glass pane is a clear float glass pane, preferably a low iron float glass pane. By clear float glass, it is meant a glass having a composition as defined in BS EN 572-1 and BS EN 572-2 (2004). For clear float glass, the Fe$_2$O$_3$ level by weight is typically 0.11%. Float glass with an Fe$_2$O$_3$ content less than about 0.05% by weight is typically referred to as low iron float glass. Such glass usually has the same basic composition of the other component oxides i.e. low iron float glass is also a soda-lime-silicate glass, as is clear float glass. Typically low iron float glass has less than 0.02% by weight Fe$_2$O$_3$. Alternatively the glass pane is a borosilicate-based glass pane, an alkali-aluminosilicate-based glass pane, or an aluminium oxide-based crystal glass pane. The glass pane may be toughened to an extent by any suitable means such as a thermal and/or chemical toughening process.

According to a second aspect of the present invention there is provided a coated glass pane produced in accordance with the method of the first aspect.

According to a third aspect of the present invention there is provided the use of silazanes to planarise a surface of a coating on a glass pane comprising:

providing a glass pane that is directly or indirectly coated on a major surface thereof with an underlayer, and depositing at least one layer based on one or more silazane on said underlayer.

Preferably said use further comprises partially or completely converting the at least one layer based on one or more silazane to at least one layer based on silica and/or an organo silica.

According to a fourth aspect of the present invention there is provided the use of silazanes to reduce the haze exhibited by a coated glass pane comprising:

providing a glass pane that is directly or indirectly coated on a major surface thereof with an underlayer, and depositing at least one layer based on one or more silazane on said underlayer.

Preferably said use further comprises partially or completely converting the at least one layer based on one or more silazane to at least one layer based on silica and/or an organo silica.

According to a fifth aspect of the present invention there is provided a coated glass pane comprising at least the following layers in sequence:

a glass pane, an underlayer, and at least one layer based on silica and/or an organo silica, wherein a surface of said layer based on silica and/or an organo silica has an arithmetical mean height of the surface value, Sa, of at most 2 nm.

According to a sixth aspect of the present invention there is provided a coated glass pane comprising at least the following layers in sequence:

a glass pane, an underlayer, and at least one layer based on silica and/or an organo silica;

wherein the at least one layer based on silica and/or an organo silica has a thickness of at least 100 nm, and wherein the at least one layer based on silica and/or an organo silica is obtained by partially or completely converting at least one layer based on one or more silazane.

According to a seventh aspect of the present invention there is provided a coated glass pane comprising at least the following layers in sequence:

a glass pane, an underlayer, and at least one layer based on silica and/or an organo silica;

wherein the underlayer comprises at least one layer based on a transparent conductive coating (TCC), wherein the TCC is a transparent conductive oxide (TCO), and wherein the TCO is one or more of fluorine doped tin oxide ($SnO_2$:F), zinc oxide doped with aluminium, gallium or boron (ZnO: Al, ZnO:Ga, ZnO:B), indium oxide doped with tin (ITO), cadmium stannate, ITO:ZnO, ITO:Ti, $In_2O_3$, $In_2O_3$—ZnO (IZO), $In_2O_3$:Ti, $In_2O_3$:Mo, $In_2O_3$:Ga, $In_2O_3$:W, $In_2O_3$:Zr, $In_2O_3$:Nb, $In_{2-2x}M_xSn_xO_3$ with M being Zn or Cu, ZnO:F, $Zn_{0.9}Mg_{0.1}O$:Ga, (Zn,Mg)O:P, ITO:Fe, $SnO_2$:Co, $In_2O_3$: (Sn,Ni), ZnO:Mn, and/or ZnO:Co, wherein each layer of the at least one layer based on a TCC has a thickness of at least 20 nm, but at most 600 nm, wherein the underlayer further comprises at least one further layer, wherein said at least one further layer is based on an oxide of a metal or of a metalloid, such as $SiO_2$, $SnO_2$, $TiO_2$, silicon oxynitride and/or aluminium oxide, wherein each layer of the at least one further layer based on an oxide of a metal or of a metalloid has a thickness of at least 10 nm, but at most 50 nm, and wherein the at least one layer based on silica and/or an organo silica has a thickness of at least 100 nm.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

BRIEF DESCRIPTION OF THE DRAWINGS

The invention will now be further described by way of the following specific embodiments, which are given by way of illustration and not of limitation, with reference to the accompanying drawings in which:

FIG. 1 is a graph that shows Arithmetical Mean Height of the Surface Values, Sa, vs. silica layer thickness for several comparative coated glass panes and a number of coated glass panes according to the present invention prepared using the precursor PHPS;

FIG. 2 is a graph that shows Arithmetical Mean Height of the Surface Values, Sa, vs. organo silica layer thickness for a comparative reference coated glass pane and a number of coated glass panes according to the present invention prepared using the precursor PDMS; and FIG. 3 is a graph that shows percentage haze values vs. silica layer thickness for a comparative reference coated glass pane and a number of coated glass panes according to the present invention prepared using the precursor PHPS.

DETAILED DESCRIPTION OF THE INVENTION

Examples

Samples of NSG TEC (RTM) 15 (glass (thickness=3.2 mm)/tin oxide (25 nm)/silicon dioxide (25 nm)/fluorine doped tin oxide (340 nm)) glass (sample size=75 mm×75 mm) were used in all examples.

Examples according to the invention were prepared by spin coating samples with perhydropolysilazane (PHPS) or polydimethylsilazane (PDMS).

PHPS or PDMS solution was mixed with dibutylether (DBE) using a range of dilutions as shown below in Table 1:

TABLE 1

Concentration and dilution of solutions of PHPS or PDMS in DBE, and corresponding PHPS or PDMS layer thicknesses obtained.

| Concentration of PHPS or PDMS (% by volume) | Dilution of PHPS:DBE or PDMS:DBE | PHPS or PDMS Film Thickness (nm) |
| --- | --- | --- |
| 7.6 | 1:12.2 | 21.7 |
| 9.7 | 1:9.34 | 26.1 |
| 15.8 | 1:5.33 | 40.2 |
| 18.9 | 1:4.30 | 46.5 |
| 32.3 | 1:2.10 | 83.8 |
| 37.3 | 1:1.68 | 97.7 |
| 48.7 | 1:1.054 | 132.7 |
| 55.7 | 1:0.795 | 153.2 |

The spin coating process parameters were:

| | |
| --- | --- |
| Coating solution dispense volume | ca. 2 ml |
| Spin speed | 2000 rpm |
| Acceleration | 1000 rpm/sec. |

The samples were then cured for 1 hr at 500° C. (involving ca. 1 hr heat up to the desired temperature, 1 hr hold at said temperature, and ca. 8 hr of cooling down to room temperature) to provide an outer layer of silica (from a PHPS precursor) or organo silica (from a PDMS precursor).

Comparative examples were prepared by depositing a 20-150 nm thick $SiO_2$ layer on a number of samples of TEC® 15 via chemical vapour deposition (CVD).

Roughness Data (Arithmetical Mean Height of the Surface Values, Sa) was obtained in accordance with ISO 25178 using atomic force microscopy. Percentage haze values were measured in accordance with the ASTM D 1003-61 standard.

FIGS. 1 and 2 show the planarising effect of coating an underlayer with perhydropolysilazane (PHPS) or polydimethylsilazane (PDMS, MQ70®) respectively followed by curing of the outer coatings to form a silica layer or an organo silica layer respectively.

In FIG. 1, several data points lie on the y-axis of the graph which are comparative reference samples, i.e. samples of TEC® 15 with no further coatings. All of the other samples, apart from those represented by data series B, are comparative and are samples of TEC® 15 that have been coated with silica using atmospheric pressure CVD.

Comparative data series A represents samples of TEC® 15 that were coated with silica on a 6 inch (15 cm) atmospheric pressure thermal CVD coater using Di-t-butoxydiacetoxysilane (DBDAS) as the silica precursor (apart from the reference sample shown on the y-axis). Silica coatings were deposited onto NSG TEC® 15 at 650° C., typically using a DBDAS gas phase concentration of 0.4%, oxygen at 0.223 mol/min and a nitrogen carrier flow of up to 11 l/min.

Data series B represents samples according to the invention that were prepared as detailed above using PHPS as the silica precursor layer (apart from the reference sample shown on the y-axis). Curve E is a best fit through data series B.

Comparative data series C represents samples of TEC® 15 that were coated with silica on an atmospheric pressure thermal CVD coater using $SiCl_4$ in EtOAc. Silica coatings were deposited onto an NSG TEC® 15 substrate held at between 580° C. and 650° C., typically using flows of 0.5-2 l/min of nitrogen through a $SiCl_4$ bubbler, 2 l/min $O_2$, 3-7 l/min $N_2$ carrier gas, 100-300 l/min of EtOAc. Deposition times ranged from 15 to 120 seconds.

Comparative data series D represents samples of TEC® 15 that were coated with silica on an atmospheric pressure thermal CVD coater using $SiH_4$ (apart from the reference samples shown on the y-axis). The samples were subsequently polished to varying degrees (hence the presence of more than one data point at each thickness of silica) using a polishing brush (Standard, V3106, V3107 or V3109 supplied by Botech) and a liquid polishing medium containing an abrasive suspension of alumina ("Acepol AL" alumina slurry by Aachener Chemische Werke, diluted to 10% by volume). The best results were achieved by impregnating the brushes with a silicon carbide or aluminium oxide abrasive. During polishing, the brush was lowered until contact was just made with the exposed coating layer, such that the tips of the brush bristles were providing the majority of the contact between brush and coating.

In FIG. 2, data series A represents samples according to the invention that were prepared as detailed above using PDMS as the organo silica precursor layer.

Comparative reference data point B represents a sample of TEC® 15 with no further coatings.

FIGS. 1 and 2 illustrate that silica and organo silica coatings that were derived from PHPS and PDMS coatings respectively exhibit substantial planarising effects when assessed against comparative examples. Furthermore, from FIG. 1 it can be seen that samples bearing silica coatings of 100 nm thickness or more that are derived from PHPS coatings exhibit extremely high planarity. FIG. 2 shows that correspondingly high levels of planarity are exhibited by all four of the samples bearing organo silica coatings (thicknesses of 250 nm or 750 nm) that are derived from PDMS coatings.

In FIG. 3, data point A represents a reference sample of TEC® 15 with no further coatings. Data series B and C represent samples that were analysed for haze levels 1 year after production and immediately after production respectively. The samples for series B and C were prepared as detailed above using PHPS as the silica precursor layer. FIG. 3 shows that the use of PHPS as a precursor layer enables the provision of a silica coated glass pane that exhibits very low haze in comparison with the reference sample. Moreover these low levels of haze are maintained over time.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of planarising a surface of a coating on a glass pane comprising:
    providing a glass pane that is directly or indirectly coated on a major surface thereof with a rough underlayer, and
    depositing at least one layer based on one or more silazane or polysilazane on said underlayer; wherein
    the method further comprises partially or completely converting the at least one layer based on one or more silazane or polysilazane to at least one layer based on silica and/or an organo silica, and
    wherein the rough underlayer comprises at least one layer based on a transparent conductive coating (TCC), wherein the TCC is a transparent conductive oxide (TCO), and wherein the TCO is one or more of fluorine doped tin oxide ($SnO_2$:F), zinc oxide doped with aluminium, gallium or boron (ZnO:Al, ZnO:Ga, ZnO:B), indium oxide doped with tin (ITO), cadmium stannate, ITO:ZnO, ITO:Ti, $In_2O_3$, $In_2O_3ZnO$ (IZO), $In_2O_3$:Ti, $In_2O_3$:Mo, $In_2O_3$:Ga, $In_2O_3$:W, $In_2O_3$:Zr, $In_2O_3$:Nb, $In_{2-2x}M_xSn_xO_3$ with M being Zn or Cu, ZnO:F, $Zn_{0.9}Mg_{0.1}O$:Ga, (Zn,Mg)O:P, ITO:Fe, $SnO_2$:Co, $In_2O_3$:Ni, $In_2O_3$:(Sn,Ni), ZnO:Mn, and/or ZnO:Co, and wherein each layer of the at least one layer based on a TCC has a thickness of at least 20 nm, but at most 600 nm, and wherein a surface of the at least one layer based on silica and/or an organo silica has an arithmetical mean height of the surface value, Sa, of at most 3 nm, and wherein after depositing the layer based on one or more polysilazane or silazane, and/or after partially or completely converting the layer based on one or more polysilazane or silazane to at least one layer based on silica and/or an organo silica, said pane exhibits a haze value measured in accordance with the ASTM D 1003-61 standard of from 0.2% to 1.0%.

2. The method according to claim 1, wherein said polysilazane or silazane is comprised of a perhydropolysilazane, a polymethylsilazane and/or a polydimethylsilazane.

3. The method according to claim 1, wherein the polysilazane or silazane is a polysilazane, and the polysilazane has a number average molecular weight of 1000 to 200,000 g/mol.

4. The method according to claim 1, wherein said at least one layer based on one or more polysilazane or silazane is deposited by spin coating, slot die coating, spraying, roller coating, dipping, and/or printing.

5. The method according to claim 1, wherein said conversion comprises treating the pane with heat after depositing the layer based on one or more polysilazane or silazane.

6. The method according to claim 5, wherein said heat treatment comprises heating the pane at at least 100° C., but at most 700° C.

7. The method according to claim 6, wherein said heat treatment further comprises heating the pane at said temperature for at least 30 min, but at most 4 hr.

8. The method according to claim 6, wherein said heat treatment further comprises heating the pane to said temperature over a period of at least 20 min.

9. The method according to claim 1, wherein said conversion comprises treating the pane with UV and/or IR radiation treatment which comprises exposing said layer based on one or more polysilazane or silazane to UV and/or IR radiation for at least 3 min, but at most 1 hr.

10. The method according to claim 1, wherein said at least one layer based on silica and/or an organo silica has a thickness of at least 10 nm, but at most 400 nm.

11. The method according to claim 10, wherein said at least one layer based on silica and/or an organo silica has a thickness of at least 100 nm.

12. The method according to claim 1, wherein after depositing the layer based on one or more polysilazane or silazane, and/or after partially or completely converting the layer based on one or more polysilazane or silazane to at least one layer based on silica and/or an organo silica, said pane exhibits a haze of at most 0.6%.

13. The method according to claim 1, wherein the underlayer further comprises at least one further layer, wherein said at least one further layer is based on an oxide of a metal or of a metalloid, selected from the group consisting of $SiO_2$, $SnO_2$, $TiO_2$, silicon oxynitride and/or aluminium oxide.

14. The method according to claim 13, wherein each layer of the at least one further layer based on an oxide of a metal or of a metalloid has a thickness of at least 10 nm, but at most 50 nm.

15. The method according to claim 1, wherein the underlayer further comprises at least one further layer, wherein said at least one further layer is based on $SiO_2$, $SnO_2$, $TiO_2$, silicon oxynitride and/or aluminium oxide.

16. The method according to claim 1, wherein the underlayer comprises, in sequence from the glass pane:
 a lower anti-reflection layer;
 a silver-based functional layer; and
 at least one further anti-reflection layer.

17. The method according to claim 1, wherein the method further comprises depositing at least one overlayer on the at least one layer based on one or more polysilazane or silazane and/or based on silica and/or an organo silica.

18. The method according to claim 1, wherein the at least one silazane or polysilazane comprises a polysilazane, and the polysilazane has a density of 0.5 to 1.5 g/cm³.

* * * * *